Aug. 12, 1941.  F. A. REYNOLDS  2,252,205
GEARLESS DIFFERENTIAL
Filed Sept. 19, 1939  2 Sheets-Sheet 1
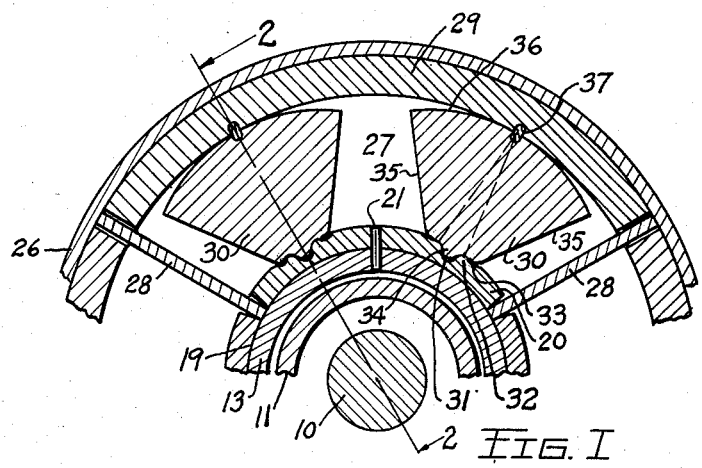
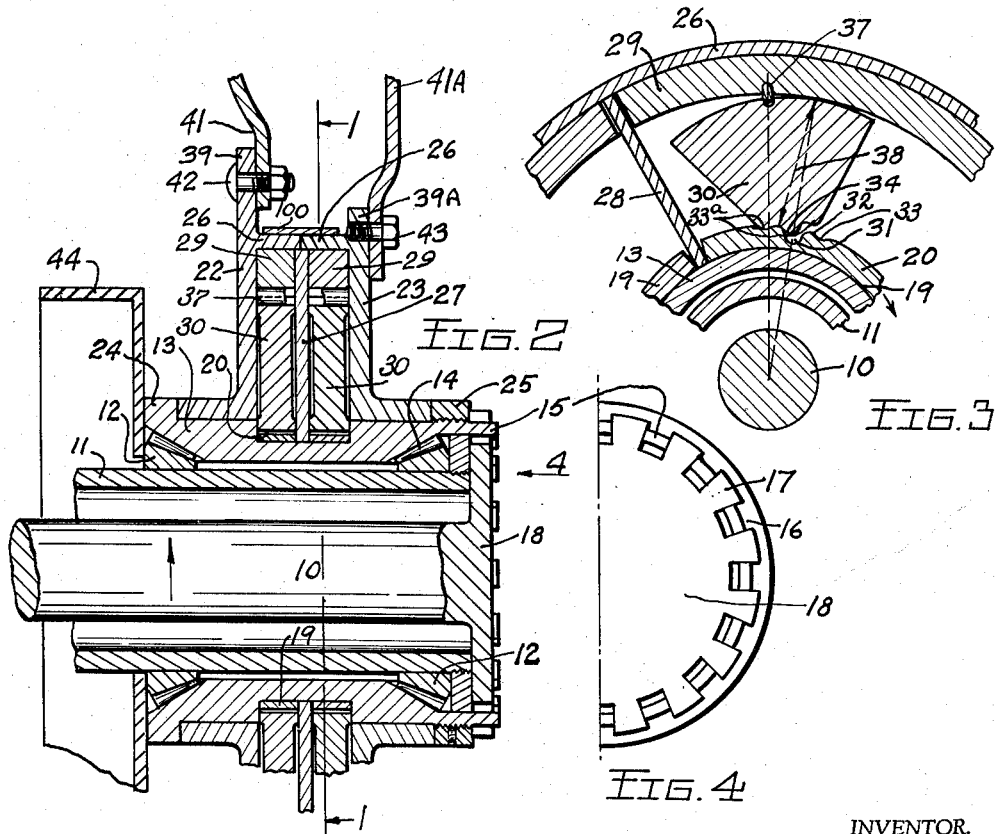
INVENTOR.
FREDERICK A. REYNOLDS
BY Martin E. Anderson
ATTORNEY.

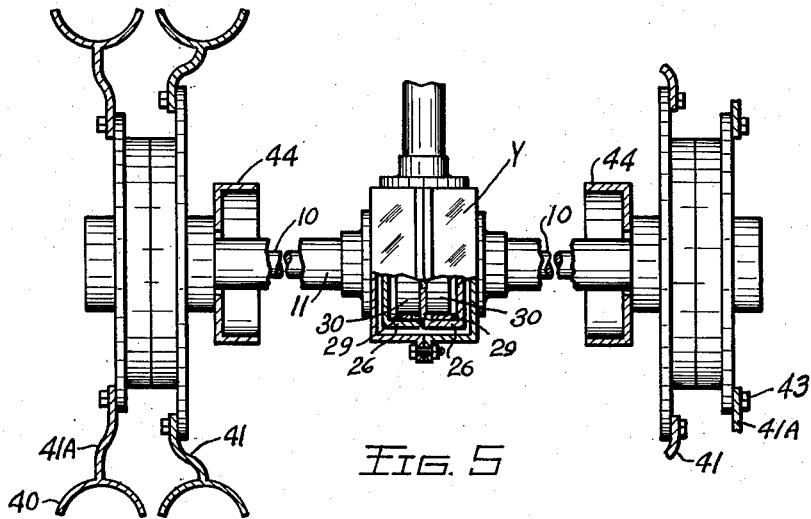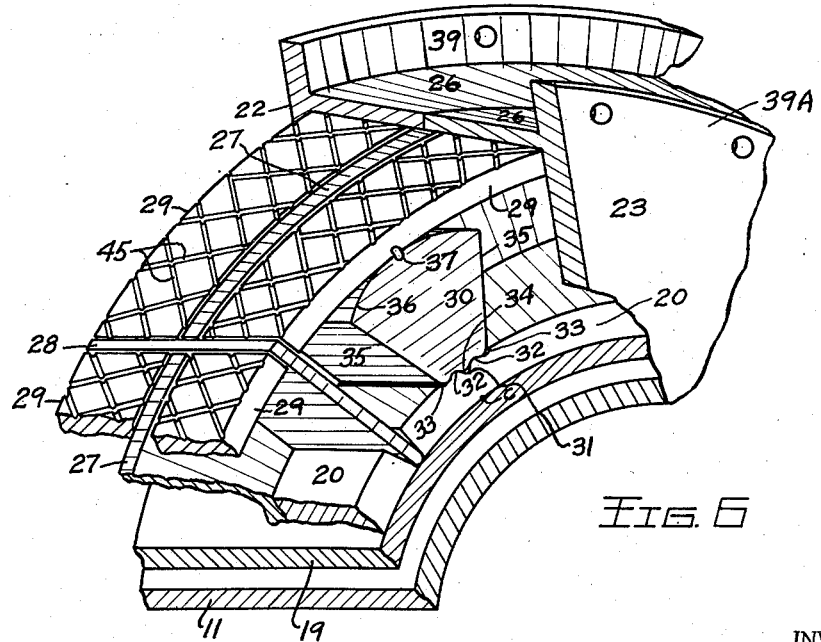

Patented Aug. 12, 1941

2,252,205

UNITED STATES PATENT OFFICE 2,252,205

GEARLESS DIFFERENTIAL

Frederick A. Reynolds, Denver, Colo., assignor to Martin E. Anderson, Denver, Colo.

Application September 19, 1939, Serial No. 295,563

17 Claims. (Cl. 180—22)

This invention relates to improvements in differential mechanisms and has reference more particularly to a gearless differential intended for use with automotive vehicles such as automobiles and trucks.

In my copending application, Serial No. 274,549, filed May 19, 1939, I have described and shown a gearless differential of the general type to which this invention relates.

This invention embodies an improved construction and is of a specifically different design than that illustrated in the application above identified. Practically all trucks and automotive vehicles are provided with differentials of the type using two opposed bevel gears interconnected by means of bevel pinions carried by a rotating spider which is driven directly from the engine. Such differentials work satisfactorily when both drive wheels have traction, but if one of the drive wheels should be positioned on a piece of ice, or snow, or in a soft spot in the road while the automobile is traveling up a steep grade, the wheel that has the least amount of traction will begin to spin, while the wheel that has the greater amount of traction will remain stationary.

It is the object of this invention to produce a differential mechanism that will always transmit the torque or power to the wheel that has the greater amount of traction and therefore when an automotive vehicle equipped with this type of differential travels over an ungrade where there may be patches of ice or snow, the vehicle will continue to move as long as one or the other of the drive wheels has traction.

It is quite customary with heavy duty trucks to provide the rear axle with two or more wheels at each end. When the two wheels are non-rotatably connected with the hub, it is evident that one or the other of the wheels will have to slide in going around curves because the two wheels are spaced a considerable distance apart and therefore travel over paths of unequal length. This slippage results in excessive wear of the tires and since these are very expensive, this arrangement is highly objectionable. In order to prevent the excessive wear due to slippage, it has been proposed to mount one of the wheels on the hub in such a way that it can rotate freely, but the result of this is that although both wheels contribute to supporting the load the driving action is effected through one wheel only, which is objectionable for the reason that the tire that does the driving always wears faster than the tire of the idle wheel and besides, if the driving wheel should pass over a depression in the road so as to be moved out of contact with the road surface, it would lose its traction and the automobile would stop if it were traveling on an upgrade.

Another object of this invention is to produce a rear axle having dual wheels at each end and provide the same with a differential of the type that forms the subject of this invention for transmitting power from the engine to the two parts of the rear axle and at the same time to provide a similar differential between each part of the dual wheels. Due to the fact that the differential to which this invention relates will always transmit power to the wheel that has the traction, it is evident that with such an arrangement the vehicle will continue to travel as long as one set of dual wheels or one wheel of each set of dual wheels has good traction.

The above and other objects that may become apparent as this description proceeds are attained by means of a construction and an arrangement of parts that will now be described in detail and for this purpose reference will be had to the accompanying drawings in which the invention has been illustrated in its preferred form and in which:

Figure 1 is a section taken on line 1—1, Figure 2;

Figure 2 is a diametrical section taken on line 2—2, Figure 1;

Figure 3 is a fragmentary section similar to that shown in Figure 1 and shows the position of the parts when torque is transmitted to the wheels from the axle of an automobile;

Figure 4 is an end elevation looking in the direction of arrow 4 in Figure 2 and shows, among other things, the driving connection between the rear shaft and the hub of the drive wheels;

Figure 5 is a top plan view, partly in section, of a rear axle showing the position of the three differentials; and Figure 6 is a fragmentary view showing the relationship of the parts in assembled position.

In the drawings reference numeral 10 represents one of the sections of the rear axle and reference numeral 11 designates the axle housing. The construction illustrated is of the full floating rear axle type and the axle housing has been shown as provided with roller bearings whose inner roller races have been designated by reference numeral 12. A tubular hub 13 extends over the axle housing and is supported by the roller races 12 from which it is separated by the usual conical rollers 14. The bearing has been illustrated in a more or less diagrammatic manner for the reason that this forms no part of the invention and it is contemplated that bearings of ordinary and usual construction are to be employed. The outer end of the hub is provided with a flange 15 that extends beyond the end of the axle housing and which is provided with spaced teeth between which the lugs 17 of the power transmitting spider 18 at the end of the axle 10 are positioned. It is evident that when the axle turns the hub 13 will also be rotated. In the embodiment illustrated, hub 13 has been shown as provided on its outside with an annular depression 19 in which is located a plurality of arcuate steel segments 20. These segments are provided with openings for the reception of pins 21 that extend outwardly from the hub 13 in the manner shown in Figure 1. Rotatably mounted on the tubular hub are two clutch members 22 and 23. The clutch members are substantial duplicates and differ from each other only in a minor particular to which reference will hereinafter be made. One end of the tubular hub has an integral shoulder 24 that forms an abutment for the end of the hub of the inside clutch member 22. A nut or ring 25 is threadedly connected with the outer end of the tubular hub so as to limit the longitudinal movement of clutch member 23. In the actual construction a bronze bushing is provided between the tubular hubs and the bearing surfaces of the clutch members 22 and 23, but this has been omitted in the drawing as it involves merely the matter of selection. The clutch members are each provided with cylindrical flanges 26 that project towards each other and form a cylindrical outer wall. The sides of clutch members 22 and 23 and the flanges 26, together with the outer surface of the annular recess 19 form an annular chamber and this is divided into two compartments by means of a partition 27. The partition is formed in two or more parts and extends outwardly substantially to the inner surfaces of flanges 26. Positioned in the recess 19 are a plurality of arcuate steel segments 20 to which reference has already been made. Plates 28 extend from the bottom of the recess 19 radially to a point adjacent the inner surfaces of flanges 26 and pass through openings between the partition plates 27 in the manner shown in Figures 1 and 6. Friction shoes 29 are positioned in each of the spaces between the radial plates 28 and their outer surfaces are curved so as to contact with the inner surfaces of flanges 26. The ends of the shoes 29 terminate adjacent the radial plates 28 but are preferably separated from the latter a short distance so as to allow a slight lost motion or the radial plates may pivot to a slight extent about the bottom surface of recess 19. In the space between each friction shoe 29 and the corresponding arcuate segment 20, there are at least two cams 30. In the embodiment illustrated two cam members have been shown and these will now be described, together with their mode of operation. It will be noticed from Figure 1 that each steel segment 20 is provided with two transverse grooves or depressions 31 which are joined on each side by convex surfaces 32 with shallow grooves 33 positioned parallel with the grooves 31. The cam members are sector shaped and are each provided at their inner ends with a single curved transverse projection 34 that is joined by means of concave surfaces to the side walls 35. The outer surface 36 of each cam member is substantially cylindrical and when in neutral position is concentric with the point C. At the middle point of the arcuate outer surface 36 of each cam member there is a transverse groove in which is positioned a transversely oblong steel pin 37 that projects into a similar depression in the shoe 29. The cams can rock about the pin 37 in a manner apparent from an inspection of Figure 3. When the parts are inoperative, each cam 30 rests on the two spaced convex surfaces 32 of members 20 in the manner shown in Figure 1. If the hub 13 and the segments 20 are rotated clockwise relative to the shoes 29, the parts assume the position shown in Figure 3 from which it will be seen that the cam 30 is now pivoted on the transverse convex surface 32 to the left of the depression 31. Force is now transmitted from the segment 20 to the shoe 29 along the line indicated by reference numeral 38 which joins the pivot point with the point of oscillation between surface 26 and the inner surface of shoe 29. It will now be apparent that due to the toggle action of the cams 30, the shoe 29 will be forced against the inner surface of flange 26 with a sufficient force to prevent relative rotation between the shoe and the flange.

Attention is called to the fact that each cam has two parallel pivot lines 33a and rocks from one to the other depending upon the direction in which the torque is being transmitted.

The construction illustrated and described provides a pivotal or roller action between the cam and the supporting segment 20 instead of a sliding motion and therefore the parts will not wear away as fast as they would if a sliding or a rotary motion were employed. The forces employed at this point are so great that the lubricating film is reduced to practically nothing and therefore the rocking or rolling motion makes it possible to reduce the wear to a minimum.

In emergencies where low gears are employed the forces tending to distort flanges 26 and shoes 29 may become so great as to actually stretch or bend the parts. To prevent the production of extremely high forces the connection between cams 30 and their supporting segments 20 have been so designed that the pivot point will move towards the left (Fig. 3) as the hub 13 turns to the right relative to the flanges 26 and the result of this is that the angle between the lines of force and the inside of shoes 29 will decrease whereupon the resultant radially acting force will decrease relative to the torque. The automatic shifting of the pivot prevents the production of dangerous radial forces.

Referring now more particularly to Figure 2, it will be pointed out that the inner clutch member 22 is provided with a flange 39 that extends a considerable distance to the outside of the flange 26. The tire supporting rim 40 is provided with an annular inwardly extending flange 41 that overlaps the flange 39 and is secured to the latter by bolts 42. The other clutch member 23 has an outwardly extending flange 39a that is of smaller diameter than the corresponding flange 39 and the opening in the inwardly extending flange 41 is slightly bigger than the outside diameter of flange 39a so that it may pass freely over flange 39a when the inner tire is being removed or applied. The rim 40 for the outer wheel has an inwardly extending flange 41A that overlaps the side of clutch member 23 and is secured to the latter by means of bolts 43. A brake drum 44 is connected with the inner end of each hub 13.

Referring more particularly to Figure 6, it will be seen that the shoes 29 have their outer surfaces provided with grooves 45 which serve to retain lubricant and to divide the surface into areas small enough to enable the pressure to reduce the lubricating film to such an extent that the required friction can be obtained. Instead of a surface like that illustrated, the outer surfaces of shoes 29 may be covered with ordinary automobile brake lining. This has not been shown because it is a matter that is believed to be within the province of mechanical skill.

Let us now assume that power is being applied to shaft 10 tending to rotate it in a direction to move the vehicle forwardly. Since the rims 40 are connected with the clutch members and since these are rotatable on hub 13, it is evident that the vehicle will not move unless some power transmitting connection is provided between the hub and the clutch members. As soon as relative rotation takes place between the steel segment 20 and flanges 26 and the parts move toward the position shown in Figure 3, whereupon the cams pivot or roll on their supporting surfaces and force the shoes 29 against the inner surfaces of flanges 26, thereupon producing sufficient frictional resistance to make the wheels rotate in response to the torque exerted on them by the axle. As long as both of the wheels are in contact with the ground, they will both exert attractive effort. Let us assume that one of the supporting wheels passes over a depression in the road and that the load is supported exclusively by the other wheel. If an ordinary differential were employed, the wheel that did not contact with the roadway would start rotating with the result that the vehicle would stop because there would be no tractive force exerted by the rear axle assembly. With the clutch illustrated and described herein, however, the tractive effort will still be applied to the wheel that rests on the roadway and the forward movement of the vehicle will continue. If the rear axle is provided at its center point with a differential constructed in the manner shown on the drawings and described herein, the vehicle will continue to move on an upgrade, even if both wheels at one end of the axle are supported on ice or on a very slippery part of the pavement, because the force is always transmitted to the wheel or to the pair of wheels that have the greater traction. The function of the radial plates 28 is to prevent the clutch mechanism from operating to prevent one wheel overrunning the other, as, for example, when turning a corner.

It is obvious that when the vehicle is traveling in a curved path, a differential action must take place to prevent the wheels from slipping and with the differential here described, the power for propelling the vehicle around curves is exerted by the pair of wheels traveling along the path of greatest curvative and it is therefore essential that the clutch comprising the cams 30 shall not operate to prevent the overrunning necessary to effect a free action while negotiating curves in the roadway.

Let us assume that power is transmitted to one wheel as shown in Figure 3 and that the other wheel begins to overrun the shaft 10. The friction of the parts in the overrunning wheel have a tendency to rock the cams into a position reverse to that of the wheel that drives, but this is prevented by the interengagement of shoes 29 and radial plates 28 that prevents such reversal from taking place. The movement is so proportioned that when one wheel begins to overrun the other, the corresponding cams can move to neutral position only.

Attention is directed particularly to the combination illustrated in Figure 5 in which the two parts of the axle 10 are interconnected by means of a differential Y, which is constructed in the general manner illustrated in Figure 2 with the exception that rotor 13 is driven by a gear in the usual manner, the power being transmitted through flanges 26 to the two parts of the shaft in a manner analogous to that shown in Figure 3 of United States Patent No. 989,040 granted April 11, 1911 and which always transmits power to the shaft that is rotating the slower and that the two wheels of each duplex pair receive their power from a similar differential that transmits its power to the wheel that rotates the slower. With this combination of parts, the danger of becoming stalled when traveling upwardly along an inclined roadway whose surface has patches of ice or snow or other patches that reduce the friction between the wheels and the roadway is removed and there is no danger of the vehicle losing its forward motion.

A band 100 surrounds flanges 26 and serves to keep dust from entering the differential chamber.

Some of the advantages of this type of differential over the ordinary gear type will now be briefly mentioned.

In trucks having dual drive wheels both wheels are driven as if positively interlocked and at the same time no slipping of tires takes place on turns.

In cases of unequal traction each wheel performs as much of the work as its traction permits and does not prevent the wheel having traction from exerting its maximum prospective force.

All chattering of wheels on rough roads, due to slippage during acceleration and to deceleration with its resultant tire wear and loss of power is eliminated.

With the ordinary gear differential all propulsive effort is lost when one of the drive wheels is out of contact with the roadway which objectionable feature is entirely eliminated by this differential.

In going down curved roads the braking action is increased due to the fact that it functions through the fastest rotating wheel.

With gear differentials severe end thrusts developed which are entirely absent with this type of differential.

Due to the fact that the end thrust has been eliminated and to the absence of the small differential pinions with their extremely high pressures at the points of contact the frictional losses are reduced to such an extent that the propulsive force per unit of power is greater on steep winding roads than with gear differentials.

In the drawings and in the claims the partition member 27 has been mentioned and it is believed to be a desirable element because there is relative rotation between the two sets of cams and shoes. If the machine work is carefully done, however, it is possible to omit the partition plate 27 and depend on the smoothness of the adjacent surfaces to prevent accidental interlocking.

The radial plates 28 are merely indicative of means for preventing the double acting cams of the overrunning clutch from interlocking and can be replaced by any other equivalent means, for example, means of the type shown in the copending application above identified.

This invention in its broadest aspect comprises a source of power two members such as wheels or equivalent devices mounted for relative rotation with respect to the power member and each connected with the power by means of a double acting clutch, and means interconnecting the clutch members for the purpose of permitting one wheel to overrun the other, while the slower moving one is connected with the source of power. In the present construction the interconnecting means comprises the plates 28 which, of course, may be replaced with any mechanical equivalent.

Having described my invention what is claimed as new is:

1. A differential mechanism comprising a power driven rotor, two clutch members rotatably connected with the rotor, each of said clutch members having a cylindrical flange, the flanges being turned towards each other to form an annular chamber, a plate separating the chamber into two compartments, radial plates separating the compartments into arcuate sections, an arcuate friction shoe in each arcuate section, positioned adjacent the inner surface of the flange and two double acting cam members positioned between the rotor and the shoe, the ends of the shoes terminating adjacent the radial plates, whereby either one of the clutch members can overrun the other and whereby driving connection will always be maintained between the rotor and the clutch member that rotates the slower.

2. A differential mechanism comprising in combination a two-part housing having a chamber of circular cross section, a partition plate extending across the chamber and dividing it into two circular compartments, a power driven rotor extending axially through the chamber, the housing members being mounted for rotation on the rotor, the housing members having cylindrical walls, a plurality of angularly spaced radial plates extending from the rotor to the inner surfaces of the cylindrical walls, the radial plates extending across the partition, segmental friction shoes positioned adjacent the inner surfaces of the cylindrical walls with their ends terminating adjacent the radial plates and a plurality of double-acting cam members extending from the outer surface of the rotor to the friction shoes for urging them against the inner cylindrical wall surface when the rotor turns relative to the housing.

3. A differential mechanism comprising in combination a two-part housing having a chamber of circular cross section, a partition plate extending across the chamber and dividing it into two circular compartments, a power driven rotor extending axially through the chamber, the housing members being mounted for rotation on the rotor, the housing members having cylindrical outer walls, a plurality of angularly spaced radial plates extending from the rotor to the inner surfaces of the cylindrical walls, the radial plates extending across the partition, segmental friction shoes positioned adjacent the inner surfaces of the cylindrical walls with their ends terminating adjacent the radial plates, and a plurality of double-acting cam members extending from the outer surface of the cylindrical wall surface for forcing the shoes against the flanges when the rotor turns relative to the housing, the cam members having rotarially spaced shiftable pivotal connection with the rotor, the outer surfaces of the cams being concentric with respect to a point intermediate the pivot points whereby the distance from the pivot point to the point of contact with the inner surface of the shoe tends to increase when the rotor turns relative to the shoe.

4. A differential clutch mechanism comprising in combination, a power driven rotor, a circular housing formed from two clutch members having opposed cylindrical flanges, said members being mounted on the rotor and rotatable thereon, the two clutch members forming with the rotor an annular chamber, a partition member dividing the chamber into two annular compartments, radial plates extending from the rotor to the inner surfaces of the cylindrical flanges, said plates extending across the partition and dividing the annular compartments into arcuate sections, a friction shoe positioned in each arcuate section with its outer surface in contact with the inner surface of the corresponding flange, a plurality of cam members positioned between the rotor and the inner surface of the shoe, the cams having each a pivotal connection with the rotor, the outer surfaces of the cams increasing in distance from the pivot point to each side thereof whereby when the rotor turns in either direction relative to the shoes the cams function to force the shoes against the inner surfaces of the flanges.

5. A differential mechanism, comprising, in combination, a power operated rotor, a two clutch member carried by the rotor and rotatable relative thereto, the clutch members having cylindrical flanges extending from one side thereof and bearing hubs in which the rotor is journalled, a partition positioned between the clutch members dividing the chamber formed between the clutch member and the rotor into two compartments, a plurality of plates extending radially from the rotor and terminating adjacent the inner surfaces of the flanges, said plates extending on both sides of the partition, friction shoes positioned adjacent the inner surfaces of the flanges in the spaces between the radial plates, and a plurality of double-acting cams positioned between the rotor and each friction shoe, the cams having each two angularly spaced pivotal connections with the rotor, whereby when the rotor turns relative to the clutch members the cams will rock about the corresponding pivots and force the friction shoes against the inner surfaces of the flanges to establish a power transmitting connection between the rotor and the clutch members.

6. A differential mechanism for use with dual wheel drives comprising, in combination, a tubular hub, a pair of cup-shaped clutch members mounted for rotation on the hub, the clutch members having cylindrical flanges projecting inwardly whereby an annular chamber is formed between the clutch members and the rotor, a partition plate extending from the rotor towards the inner surfaces of the flanges for dividing the chamber into two annular compartments, a plurality of plates or the like extending radially outwardly from the rotor and dividing the compartments into sectors, a friction shoe positioned in each sector in contact with the inner surface of the corresponding flange, and a plurality of double-acting cams positioned between each shoe and the rotor, said cams having each two angularly spaced pivotal connections with the rotor, whereby whenever the latter turns relative to the clutch members the cams will rock about their corresponding pivots and force the friction shoes into engagement with the inner surfaces of the flanges.

7. A differential mechanism for use with dual wheel drives comprising, in combination, a tubular hub, a pair of cup-shaped clutch members mounted for rotation on the hub, the clutch members having cylindrical flanges projecting inwardly whereby an annular chamber is formed between the clutch members and the rotor, a partition plate extending from the rotor towards the inner surfaces of the flanges for dividing the chamber into two annular compartments, a plurality of plates or the like extending radially outwardly from the rotor and dividing the compartments into sectors, a friction shoe positioned in each sector in contact with the inner surface of the corresponding flange, a plurality of double-acting cams positioned between each shoe and the rotor, said cam having a pivotal connection with the rotor whereby whenever the latter turns relative to the clutch members the cams will rock about their pivots and force the friction shoes into engagement with the inner surfaces of the flanges, and means comprising the radial plates for holding the cams associated with one of the clutch members from operating when that member overruns the rotor in the direction in which it is rotating.

8. A clutch comprising in combination, a rotor, a clutch disk mounted for rotation thereon and provided with a cylindrical flange, an arcuate friction shoe segment positioned to engage the inner surface of the flange, a double acting cam positioned in the space between the rotor and the inner surface of the shoe segment, said cam having a substantially cylindrical surface in engagement with the inner surface of the friction shoe, the radius of curvature of the cylindrical surface of the cam being less than that of the cooperating inner surface of the friction shoe, the cam having a rolling pivotal connection with the rotor whereby when the rotor turns relative to the clutch member the cam will tilt about its pivot and be forced into frictional engagement with the inner surface of the friction shoe and whereby the pivot point will move rotarily along the rotor surface as the angular relation between the rotor and the cam changes in response to deforming stresses.

9. A device in accordance with claim 8 in which the cam is symmetrical with respect to a radial line passing through the point of osculation between the inner surface of the friction shoe and the outer surface of the cam.

10. A device in accordance with claim 8 in which the cam member when in inoperative position has two spaced points of pivotal contact with the rotor, the two points being positioned equidistantly from a radial line passing through the point where the inner surface of the friction shoe osculates the inner cylindrical surface of the clutch member when the parts are in neutral position, the pivotal points being automatically shiftable in a rotary direction along the surface of the rotor when the latter changes its angular relation with respect to the cam member.

11. A differential mechanism comprising a power driven rotor, two clutch members rotatably connected with the rotor, each of said clutch members having a cylindrical flange, the flanges being turned towards each other to form an annular chamber, radial plates separating the chamber into arcuate sections, an arcuate friction shoe in each arcuate section, positioned adjacent the inner surface of the flange and two double acting cam members positioned between the rotor and the shoe, the ends of the shoes terminating adjacent the radial plates, whereby either one of the clutch members can overrun the other and whereby driving connection will always be maintained between the rotor and the clutch member that rotates the slower.

12. A differential mechanism comprising in combination a two-part housing having a chamber of circular cross section, a power driven rotor extending axially through the chamber, the housing members being mounted for rotation on the rotor, the housing members having cylindrical walls, a plurality of angularly spaced radial plates extending from the rotor to the inner surfaces of the cylindrical walls; segmental friction shoes positioned adjacent the inner surfaces of the cylindrical walls with their ends terminating adjacent the radial plates and a plurality of double-acting cam members extending from the outer surface of the rotor to the friction shoes for urging them against the inner cylindrical wall surface when the rotor turns relative to the housing.

13. A differential mechanism comprising in combination a two-part housing having a chamber of circular cross section, a power driven rotor extending axially through the chamber, the housing members being mounted for rotation on the rotor, the housing members having cylindrical outer walls, a plurality of angularly spaced radial plates extending from the rotor to the inner surfaces of the cylindrical walls, segmental friction shoes positioned adjacent the inner surfaces of the cylindrical walls with their ends terminating adjacent the radial plates, and a plurality of double-acting cam members extending from the outer surface of the cylindrical wall surface for forcing the shoes against the flanges when the rotor turns relative to the housing, the cam members having rotarilly spaced shiftable pivotal connection with the rotor, the outer surfaces of the cams being concentric with respect to a point intermediate the pivot points whereby the distance from the pivot point to the point of contact with the inner surface of the shoe tends to increase when the rotor turns relative to the shoe.

14. A differential clutch mechanism comprising in combination, a power driven rotor, a circular housing formed from two clutch members having opposed cylindrical flanges, said members being mounted on the rotor and rotatable thereon, the two clutch members forming with the rotor an annular chamber, radial plates extending from the rotor to the inner surfaces of the cylindrical flanges dividing the annular chamber into arcuate sections, a friction shoe positioned in each arcuate section with its outer surface in contact with the inner surface of the corresponding flange, a plurality of cam members positioned between the rotor and the inner surface of the shoe, the cams having each a pivotal connection with the rotor, the outer surfaces of the cams increasing in distance from the pivot point to each side thereof whereby when the rotor turns in either direction relative to the shoes the cams function to force the shoes against the inner surfaces of the flanges.

15. A differential mechanism, comprising, in combination, a power operated rotor, two clutch members carried by the rotor and rotatable relative thereto, the clutch members having cylindrical flanges extending from one side thereof and bearing hubs in which the rotor is journalled, a plurality of plates extending radially from the rotor and terminating adjacent the inner surfaces of the flanges, friction shoes positioned adjacent the inner surfaces of the flanges in the spaces between the radial plates, and a plurality of double-acting cams positioned between the rotor and each friction shoe, the cams having each two angularly spaced pivotal connections with the rotor, whereby when the rotor turns relative to the clutch members the cams will rock about the corresponding pivots and force the friction shoes against the inner surfaces of the flanges to establish a power transmitting connection between the rotor and the clutch members.

16. A differential mechanism for use with dual wheel drives comprising, in combination, a tubular hub, a pair of cup-shaped clutch members mounted for rotation on the hub, the clutch members having cylindrical flanges projecting inwardly whereby an annular chamber is formed between the clutch members and the rotor, a plurality of plates or the like extending radially outwardly from the rotor and dividing the chamber into sectors, a friction shoe positioned in each sector in contact with the inner surface of the corresponding flange, and a plurality of double-acting cams positioned between each shoe and the rotor, said cams having each two angularly spaced pivotal connections with the rotor, whereby whenever the latter turns relative to the clutch members the cams will rock about their corresponding pivots and force the friction shoes into engagement with the inner surfaces of the flanges.

17. A differential mechanism for use with dual wheel drives comprising, in combination, a tubular hub, a pair of cup-shaped clutch members mounted for rotation on the hub, the clutch members having cylindrical flanges projecting inwardly whereby an annular chamber is formed between the clutch members and the rotor, a plurality of plates or the like extending radially outwardly from the rotor and dividing the chamber into sectors, a friction shoe positioned in each sector in contact with the inner surface of the corresponding flange, a plurality of double-acting cams positioned between each shoe and the rotor, said cam having a pivotal connection with the rotor whereby whenever the latter turns relative to the clutch members the cams will rock about their pivots and force the friction shoes into engagement with the inner surfaces of the flanges, and means comprising the radial plates for holding the cams associated with one of the clutch members from operating when that member overruns the rotor in the direction in which it is rotating.

FREDERICK A. REYNOLDS.